United States Defensive Publication [19] (H) [11] T995,003

Zimmerman [43] Jun. 3, 1980

[54] MACHINE DISHWASHING FORMULATIONS CONTAINING ALKALI METAL ACETAL CARBOXYLATE POLYMERS

[75] Inventor: Victor C. Zimmerman, St. Louis, Mo.

[73] Assignee: Monsanto Company, St. Louis, Mo.

[21] Appl. No.: 92,305

[22] Filed: Nov. 8, 1979

[51] Int. Cl.³ ..... C11D 7/18

[52] U.S. Cl. ..... 252/99; 252/95; 252/187 C; 252/98

[57] ABSTRACT

Machine dishwashing formulations typically contain a low-foaming surfactant, a chlorine source and an alkali metal tripolyphosphate. Because of recent emphasis in removing phosphates from cleaning formulations, those skilled in the art have been interested in finding a substitute for some or all of the alkali metal tripolyphosphate in machine dishwashing formulations. Now there is provided a machine dishwashing formulation comprising (A) from 0.5 to 5 percent by weight of a surfactant selected from the group consisting of low-foaming anionic and nonionic surfactants and mixtures thereof, (B) an active chlorine-providing material selected from the group consisting of potassium dichlorocyanurate, sodium dichlorocyanurate, [(mono-trichloro)tetra-(monopotassiumdichloro)]pentaisocyanurate, (monotrichloro)(mono-potassiumdichloro)diisocyanurate and chlorinated trisodium phosphate, said active chlorine-providing material constituting from 10 to 30 percent by weight of the formulation when said material is chlorinated triisosodium phosphate and from 0.5 to 5 percent of the formulation when said material is a chlorocyanurate, and (C) from 20 to 90 percent of a polymer having the following general formula:

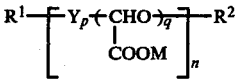

wherein Y is a comonomer selected from the group consisting of:

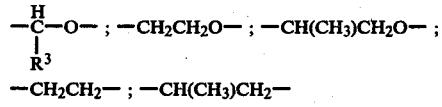

and mixtures thereof randomly distributed in the polymer; q is at least 1 and the product of q and n is at least 4; p is 0 to a whole number up to about 2; $R^1$ and $R^2$ are individually any chemically stable group which stabilize the polymer against rapid depolymerization in alkaline solution; $R^3$ is hydrogen or an alkyl group having up to about 20 carbon atoms; and M is an alkali metal.

In the preferred embodiment, the product of q and n will equal about 50, p is 0 and $R^1$ and $R^2$ are chemically stable groups derived from ethylvinyl ether and M is sodium.

7 Claims, No Sheets Drawing,

20 Pages Specification

The file of this unexamined application may be inspected and copies thereof may be purchased (849 O.G. 1221, Apr. 9, 1968).